(12) United States Patent
Beall et al.

(10) Patent No.: US 6,632,758 B2
(45) Date of Patent: Oct. 14, 2003

(54) TRANSPARENT GALLATE GLASS-CERAMICS

(75) Inventors: George H. Beall, Big Flats, NY (US); Linda R. Pinckney, Corning, NY (US); Bryce N. Samson, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/139,705

(22) Filed: May 2, 2002

(65) Prior Publication Data

US 2003/0013593 A1 Jan. 16, 2003

Related U.S. Application Data

(60) Provisional application No. 60/288,517, filed on May 3, 2001.

(51) Int. Cl.[7] .................. C03C 10/02; C03C 13/04
(52) U.S. Cl. .................. 501/10; 501/37; 65/386; 65/391; 65/33.1; 385/130; 385/141; 385/2
(58) Field of Search .................. 501/10, 37; 65/386, 65/391, 33.1; 385/130, 2, 141

(56) References Cited

U.S. PATENT DOCUMENTS

| | | | | |
|---|---|---|---|---|
| 4,935,934 A | * | 6/1990 | Ferrand et al. ............... | 372/41 |
| 5,968,857 A | | 10/1999 | Pinckney ...................... | 501/10 |
| 6,248,678 B1 | | 6/2001 | Pinckney ...................... | 501/10 |
| 6,297,179 B1 | | 10/2001 | Beall et al. ................... | 501/5 |
| 6,300,262 B1 | | 10/2001 | Beall ............................ | 501/5 |
| 6,303,527 B1 | | 10/2001 | Pinckney ...................... | 501/5 |
| 2002/0028739 A1 | | 3/2002 | Beall et al. ................... | 501/5 |

FOREIGN PATENT DOCUMENTS

| | | | | |
|---|---|---|---|---|
| WO | WO 01/28944 | 4/2001 | ........... | C03C/10/04 |
| WO | WO 01/28946 | 4/2001 | ........... | C03C/13/04 |
| WO | WO 01/31367 | 5/2001 | | |

* cited by examiner

*Primary Examiner*—Karl Group
(74) *Attorney, Agent, or Firm*—Timothy M. Schaeberle

(57) ABSTRACT

Disclosed is a substantially transparent glass-ceramic ceramic, and a method for making a glass-ceramic, exhibiting an aluminogallate spinel crystal phase and having a glass-ceramic composition that lies within the $SiO_2$—$Ga_2O_3$—$Al_2O_3$—$K_2O$—$Na_2O$— system and particularly consisting essentially, in weight percent on an oxide basis, of 25–55% $SiO_2$, 9–50% $Ga_2O_3$, 7–33% $Al_2O_3$, 0–20% $K_2O$, 0–15% $Na_2O$, 0–6 $Li_2O$ and 5–30% $K_2O+Na_2O$, the glass ceramic microstructure containing a crystal phase comprising at least 5%, by weight, of aluminogallate spinel crystals. Another aspect disclosed is optical element selected from the group consisting of an optical fiber, a gain or laser medium, and an amplifier component, a saturable absorber, with the element comprising a transparent glass-ceramic of the same composition and containing a crystallinity of at least about 5% by weight of aluminogallate spinel crystals.

32 Claims, 4 Drawing Sheets

TRANSPARENT GALLATE GLASS-CERAMICS

CROSS-REFERENCE TO RELATED APPLICATIONS

This application claims the benefit of priority under 35 U.S.C. §119(e) of U.S. Provisional Application Ser. No. 60/288,517 filed on May 3, 2001.

BACKGROUND OF THE INVENTION

1. Field of the Invention

The present invention relates generally to glass-ceramics, in particular to substantially transparent glass-ceramics containing a microstructure comprising nanocrystalline aluminogallate spinel crystals ($Li(Ga,Al)_5O_8$ and "$\gamma\text{-}(Ga,Al)_2O_3$") and solid solutions between these as the major crystalline phase.

2. Technical Background

Glass-ceramics are polycrystalline materials formed by a controlled crystallization of a precursor glass. In general, the method for producing such glass-ceramics customarily involves three fundamental steps: first, melting a glass-forming batch containing the selected metallic oxides; second, cooling the melt to a temperature at least below its transformation range, while simultaneously forming a glass body of a desired geometry; and third, heating the glass body to a temperature above the transformation range of the glass in a controlled manner to generate crystals in situ. To develop nuclei in the glass, the glass will be heated initially to a temperature within or somewhat above the transformation range for a period of time; although there are certain compositions that are known to be self-nucleating and thus do not require the development of nuclei. Thereafter, the temperature will be raised to temperatures where crystals can grow from the nuclei. The resulting crystals are typically uniformly distributed and fine-grained. Internal nucleation permits glass-ceramics to have favorable qualities such as a very narrow distribution of particle size and a highly uniform dispersion of crystals throughout the glass host.

Transparent glass-ceramics are known in the art, with the classic study relating to transparency being authored by G. H. Beall and D. A. Duke in "Transparent Glass Ceramics," *Journal of Material Science*, 4, pp. 340–352 (1969). Glass-ceramic bodies will display transparency to the human eye when the crystals present therein are considerably smaller than the wavelength of visible light. In other words, transparency typically results from crystals less than 50 nm—preferably as low as 10 nm—in size, if there is a major refractive index difference between crystal and glass. Transparency in glass-ceramics, alternatively, can also be produced with crystals larger than 50 nm if the crystal birefringence and the index of refraction mismatch between the crystal phase and the glassy phase are both low. Transparent glass-ceramics, doped with transition elements can combine the optical efficiency of crystals with the flexibility of the forming of glass. For example, both bulk (planar substrates) and fiber forms can be fabricated from these glass-ceramics.

Recently, researchers have concentrated much effort to develop transparent glass-ceramics as hosts for transition metal ions. Transition metals have been used as optically active dopants in crystalline hosts because they fluoresce in the near infrared (700 nm to 2000 nm) region. Given the useful wavelength range and relatively wide bandwidth of many transition-metal dopants, much interest has arisen for their use in optical telecommunication applications, with the region from 1000 nm to 1500 nm being of particular interest. The current optical telecommunication medium is glass-based optical fiber. Inclusion of transition metal dopants into glasses, however, has unfortunately not produced fluorescence performances as good as in crystalline materials. The performance of transition metal ions tends to degrade in amorphous hosts, where the crystal field strength is much smaller than in even crystalline hosts.

Suitable glass-ceramic hosts, therefore, must be tailored such that transition elements will preferentially partition into the crystal phase. Some of these glass-ceramics have come from compositions such as those discussed the following applications. Co-pending U.S. patent application, Pub. No. 2002/0028739, entitled FORSTERITE GLASS-CERAMICS OF HIGH CRYSTALLINITY AND CHROME CONTENT, by George H. Beall, et al., and co-pending U.S. Pat. No. 6,300,262, entitled TRANSPARENT FORSTERITE GLASS-CERAMICS, by George H. Beall both of which disclose a family of, and a method of making, glass compositions based in the $K_2O$——$MgO$——$Al_2O_3$——$SiO_2$ system. U.S. Pat. No. 6,297,179, entitled TRANSITION-METAL GLASS-CERAMIC GAIN MEDIA, by George H. Beall et al., discloses transition-metal-doped glass-ceramic materials used as gain media or pump laser fiber in optical amplifiers and lasing mechanisms. WO 01/28944 entitled TRANSPARENT LITHIUM ORTHOSILICATE GLASS-CERAMICS, by George Beall, et al., discloses a family of glass compositions within the ternary $Mg_2SiO_4$—$Zn_2SiO_4$—$Li_4SiO_4$ system and exhibiting a predominate orthosilicate crystal phase. Lastly, U.S. Pat. No. 6,303,527 entitled Transparent Glass-ceramics Based on Alpha- and Beta-Willemite, by L. R. Pinckney discloses substantially and desirably totally transparent glass-ceramics, and which contain a willemite predominant crystal phase within the ternary $Mg_2SiO_4$——$Zn_2SiO_4$——$Li_4SiO_4$system. Each of these patents and applications are co-assigned to the present assignee and the entire contents of both of these applications are incorporated herein by reference.

Transparent glass-ceramics which contain relatively small numbers of crystals can be of great use in cases where the parent glass provides an easy-to-melt or an-easy-to-form vehicle for a crystal. The single crystals may be difficult or expensive to synthesize, however they provide highly desirable features, such as optical activity. The crystals in the glass-ceramic are generally oriented randomly throughout the bulk of the glass contrary to a single crystal which has a specific orientation. Random orientation, and consequent isotropy, are advantageous for many applications. One example is that of optical amplifiers, where polarization-independent gain is imperative.

Transparent glass-ceramics doped with transition elements can combine the optical efficiency of crystals with the forming flexibility of glass. For example, both bulk (planar) and fiber forms can be fabricated from these glass-ceramics.

Transparent, transition metal-doped spinel glass-ceramics, particularly doped aluminate and gallate spinels, are known in the art. The optical properties of both aluminate and gallate spinel crystals, when doped with various transition metal ions, have also been described in the literature. Various potential applications have been disclosed, including photoluminescent phosphors as well as tunable solid state lasers and saturable absorbers for visible and near-infrared wavelengths. These studies have been carried out on single crystals or polycrystalline powders, as well as $Cr^{3+}$-doped $ZnAl_2O_4$ and $LiGa_5O_8$ glass-ceramics and a $Co^{2+}$-doped $ZnAl_2O_4$ spinel glass-ceramic; in these studies the optical properties of $Co^{2+}$-doped aluminate ($ZnAl_2O_4$) and gallate ($LiGa_5O_8$) spinel glass-ceramics were compared. The latter material comprised a doped ternary ($Li_2O$—$Ga_2O_3$—$SiO_2$) bulk glass composition and a microstructure of $LiGa_5O_8$ crystals dispersed in a silicate glass. Although the aluminate and gallate spinel glass-ceramics described above are suitable as potentially valuable hosts for small, optically active transition elements, and thus, as doped, exhibit luminescence and/or fluorescence, these gallate ternary glasses are somewhat difficult to melt and form in bulk quantities into usable forms suitable for application in the optical field industry.

Accordingly, the primary object of the present invention is to provide glass-ceramic material which is substantially and desirably totally transparent which is capable of being more easily melted and formed into optical articles than the aforementioned prior art glass-ceramics.

Another object of the present invention is to provide substantially and desirably totally transparent nanocrystalline aluminogallate spinel glass-ceramics which are capable of being doped with ingredients which confer useful optical properties including, but not limited to, luminescence and/or fluorescence, and broadband absorption.

Other objects and advantages of the present invention will be apparent from the following description.

SUMMARY OF THE INVENTION

In accordance with the present invention, one aspect of the invention disclosed is a substantially transparent glass-ceramic ceramic exhibiting an aluminogallate spinel crystal phase and having a glass-ceramic composition that lies within the $SiO_2$—$Ga_2O_3$—$Al_2O_3$—$K_2O$—$Na_2O$— system and particularly consisting essentially, in weight percent on an oxide basis, of 25–55% $SiO_2$, 9–50% $Ga_2O_3$, 7–33% $Al_2O_3$, 0–20% $K_2O$, 0–15% $Na_2O$, 0–6 $Li_2O$ and 5–30% $K_2O+Na_2O$, the glass ceramic microstructure containing a crystal phase comprising at least 5%, by weight, of aluminogallate spinel crystals.

One additional aspect of the invention relates to an optical element selected from the group consisting of an optical fiber, a gain or laser medium, and an amplifier component, a saturable absorber, the element comprising: a transparent glass-ceramic containing a crystallinity of at least about 5% by weight of aluminogallate spinel crystals, the glass-ceramic having a composition consisting essentially, in weight percent on an oxide basis, of 25–55% $SiO_2$, 9–50% $Ga_2O_3$, 2–35% $Al_2O_3$, 0–20% $K_2O$, 0–15% $Na_2O$, 0–6 $Li_2O$ and 5–30% $K_2O+Na_2O$.

In another aspect, the present invention relates to a method of making a substantially transparent glass-ceramic containing an aluminogallate spinel crystal phase and having a glass composition that lies within the $SiO_2$—$Ga_2O_3$—$Al_2O_3$—$K_2O$—$Na_2O$— system, the method comprising the steps of:

a.) melting a batch for a glass having a composition consisting essentially, in weight percent on an oxide basis, of 25–55% $SiO_2$, 9–50% $Ga_2O_3$, 2–35% $Al_2O_3$, 0–20% $K_2O$, 0–15% $Na_2O$, 0–6 $Li_2O$ and 5–30% $K_2O+Na_2O$;

b.) cooling the glass to a temperature at least below the transformation range of the glass;

c.) exposing the glass to a temperature between about 550–950° C. for a period of time sufficient to cause the generation of a glass-ceramic which is substantially transparent and which contains a predominant, aluminogallate spinel crystal phase whose glass composition lies within the $SiO_2$—$Ga_2O_3$—$Al_2O_3$—$K_2O$—$Na_2O$ system; and, d.) cooling the glass-ceramic to room temperature.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
FIG. 1 is a scanning transmission electron micrograph (STEM) of an ion milled thin section of the glass-ceramic of Example 6.

The present invention is based on the discovery of a family of compositions that can produce glasses of excellent stability which can be cerammed to produce substantially transparent glass-ceramics containing aluminogallate spinel as the predominant crystal phase.

The present inventive substantially transparent, aluminogallate glass-ceramics exhibit compositions consisting essentially, in weight percent on the oxide basis, of:

| | |
|---|---|
| $SiO_2$ | 25–55% |
| $Ga_2O_3$ | 9–50%, |
| $Al_2O_3$, | 7–33% |
| $K_2O$, | 0–20% |
| $Na_2O$, | 0–15% |
| $Li_2O$ | 0–6% |
| $K_2O + Na_2O$ | 5–30% |

The most preferred composition range, for best transparency, is based on a composition consisting essentially, in weight percent on an oxide basis, of:

| | |
|---|---|
| $SiO_2$ | 35–45% |
| $Ga_2O_3$ | 20–30%, |

-continued

| | |
|---|---|
| Al$_2$O$_3$, | 15–25% |
| K$_2$O, | 10–20% |
| Na$_2$O, | 0–15% |
| Li$_2$O | 0–6% |
| K$_2$O + Na$_2$O | 10–20% |

Optional constituents, listed in weight percent on the oxide basis, that can be included in the inventive glass-ceramic, are as follows:, of, 0–5% MgO, 0–10% TiO$_2$ 0–15% La$_2$O$_3$, an 0–10% ZrO$_2$. Additionally up to 20%, by weight GeO$_2$ can also be incorporated into the glass-ceramic.

The present invention is based on the premise that gallate-rich spinel crystals (Li(Ga,Al)$_5$O$_8$ and "γ-(Ga,Al)$_2$O$_3$ and intermediate solid solutions) of the inventive microstructure contain large Ga$^{3+}$ ions in both their octahedral and tetrahedral sites, with these sites providing a weaker crystal field environment than that obtained with conventional aluminate spinels. This feature renders the crystals potentially valuable hosts for optically active transition elements including, but not limited to Ni$^{2+}$, V$^{3+}$, Co$^{2+}$, Cu$^{2+}$, Cu$^{1+}$, Mn$^{2+}$, Cr$^{3+}$, Fe$^{2+}$, Fe$^{3+}$, and Ti$^{3+}$, specifically up to about 1%, of the oxide by weight, with some elements capable of being added in amounts exceeding 1%.

Preferably the inventive glass ceramics include, in weight percent on an oxide basis, up to 1 wt. % nickel, chromium or cobalt oxide, and more preferably about 0.001% to about 0.7%. In the most preferred embodiment the glass ceramic includes, in weight percent on an oxide basis, about 0.05 to 0.25% nickel oxide.

Because of this weaker crystal field environment, when doped with transition metal ions such as preferred dopants, octahedral Ni$^{2+}$ and tetrahedral Co$^{2+}$, the inventive aluminogallate spinels yield fluorescence and absorption spectra that are significantly shifted in peak wavelengths when compared to conventional aluminate spinels.

As such, the present inventive aluminogallate spinel glass-ceramics are suitable for utilization in the optical or telecommunications industry. In particular, the transition metal doped aluminogallate glass-ceramics of the present invention can be used as optical components in a variety of elongated core applications. For instance one useful application comprises an optical fiber in an optical amplifier or fiber laser. Other potential applications include waveguides and bulk gain media also for use in optical amplifiers and laser oscillators. Still further applications for the present glass-ceramic include utilization as saturable absorber media in laser applications.

EXAMPLES

The invention will be further clarified by the following examples set forth in Table I. Disclosed therein are a number of glass compositions, expressed in terms of parts by weight on the oxide basis, illustrating the parameters of the present invention. The Table also presents the glass color, the heat-treatment schedule in ° C. and hours, the glass-ceramic color, as well as the degree of transparency of 0.5–1.0 cm examples, ranging from low to high, exhibited by each resulting glass-ceramic.

Inasmuch as the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

TABLE I

| | 1 | 2 | 3 | 4 | 5 | 6 | 7 | 8 |
|---|---|---|---|---|---|---|---|---|
| SiO$_2$ | 38.7 | 41.5 | 41.5 | 39.6 | 39.9 | 38.6 | 37.0 | 33.1 |
| Ga$_2$O$_3$ | 42.3 | 30.0 | 30.0 | 31.0 | 26.9 | 25.1 | 24.0 | 33.4 |
| Al$_2$O$_3$ | 7.7 | 16.3 | 16.3 | 15.9 | 18.9 | 16.2 | 15.5 | 14.0 |
| Li$_2$O | 1.2 | 1.3 | 1.3 | 2.0 | 1.8 | — | — | — |
| Na$_2$O | 10.0 | 10.8 | 10.8 | — | — | — | — | — |
| K$_2$O | | | | 11.5 | 12.5 | 15.1 | 14.5 | 12.9 |
| La$_2$O$_3$ | | | | | | 4.0 | 8.0 | 5.3 |
| MgO | | | | | | 1.0 | 1.0 | 1.3 |
| TiO2 | | | | | | | | |
| NiO* | 0.5 | 0.5 | | 0.5 | 0.1 | 0.1 | 0.1 | 0.1 |
| Cr$_2$O$_3$* | | | 0.5 | | | | | |
| As$_2$O$_5$ | | | | | 0.6 | | | |
| Glass Color | red-brown | red-brown | olive-green | red-brown | red-brown | red-brown | red-brown | light blue |
| Heat Treatment (° C./hr.) | 850°-2 | 775°-2 | 725°-2 775°-2 | 750°-8 900°-2 | 750°-8 900°-2 | 850°-2 | 900°-2 | 900°-2 |
| Glass-ceramic Color | blue-green | blue-green | yellow-olive | blue-green | blue-green | blue-green | blue | blue |
| Degree of Transparency | high | medium | medium | high | high | high | medium | medium |
| Crystal Phase | Aluminogallate spinel | Aluminogallate spinel | Aluminogallate spinel | Aluminogallate spinel | Aluminogallate spinel | Aluminogallate spinel | Aluminogallate spinel | Aluminogallate spinel |

| | 9 | 10 | 11 | 12 | 13 | 14 | 15 | 16 |
|---|---|---|---|---|---|---|---|---|
| SiO$_2$ | 27.5 | 38.6 | 37.3 | 43.5 | 39.4 | 37.5 | 35.7 | 41.3 |
| Ga$_2$O$_3$ | 42.3 | 25.1 | 30.6 | 28.5 | 30.2 | 31.0 | 29.5 | 22.8 |

TABLE I-continued

| | | | | | | | | |
|---|---|---|---|---|---|---|---|---|
| $Al_2O_3$ | 11.7 | 16.2 | 13.3 | 14.3 | 16.4 | 15.9 | 15.1 | 21.8 |
| $Li_2O$ | — | — | — | — | 1.0 | 1.0 | 1.0 | 2.1 |
| $Na_2O$ | — | — | — | — | — | — | — | — |
| $K_2O$ | 10.8 | 15.1 | 12.3 | 13.2 11.5 | 13.0 | 14.7 | 14.0 | 12.0 |
| $La_2O_3$ | 6.7 | 4.0 | 5.3 | — | — | — | — | — |
| MgO | 1.0 | 1.0 | 1.1 | 0.5 | — | — | — | — |
| TiO2 | — | — | — | — | — | — | 4.8 | — |
| NiO* | 0.5 | — | 0.1 | 0.1 | 0.1 | — | — | 0.5 |
| $Cr_2O_3$* | — | 0.8 | — | — | — | — | — | — |
| $As_2O_5$ | — | — | — | — | — | 0.05 | 0.05 | — |
| Glass Color | blue-green | green | light blue | light blue | blue-green | color-less | color-less | red-brown |
| Heat Treatment (° C./hr.) | 850°-2 | 850°-2 | 900°-2 | 900°-2 | 700°-2 900°-2 | 750°-4 900°-2 | 750°-4 900°-2 | 750°-8 900°-2 |
| Glass-ceramic Color | blue-green | blue-green | yellow-olive | blue-green | blue-green | color-less | color-less | blue |
| Degree of Transparency | low | medium | medium | medium | medium | medium | low | high |
| Crystal Phase | Alumino-gallate spinel | Alumino-gallate spinel | Alumino-gallate spinel | Alumino-gallate spinel | Alumino-gallate spinel | Alumino-gallate spinel | Alumino-gallate spinel | Alumino-gallate spinel |

*Transition metal oxide dopants in excess of 100%.

The exemplary glasses were produced in the following manner. The batch materials were compounded, mixed together to assist in securing a homogeneous melt, and then placed into platinum crucibles. The crucibles were introduced into a furnace operating at temperatures of 1550°–1650° C., and the batches were melted for 4–16 hours. The melt was poured as free "patties" or pressed with a steel plate to a thickness of ~3 mm and transferred to an annealer operating at about 550–650° C. Several of these glasses crystallized to transparent glass-ceramics during annealing; further heat treatment was undesirable as it typically caused the crystals to grow sufficiently to cause some visible haze in the glass-ceramic.

Small coupons of each glass were subjected to a ceramming cycle by placing them into a furnace and heat treating according to the following schedule: heating the glass coupons at rate of 300° C./hr to temperature ranging between about 700° to 950° C., and thereafter holding the glass coupons at this temperature for a period of between about 1–4 hours, and thereafter cooling the glass coupons at furnace rate. This heat treatment was for a period of time sufficient to generate the development of nuclei therein, and thereafter sufficient to effect the growth of crystals on the nuclei. An alternative heat treatment schedule consisted of heating the glass coupons at a rate of 300° C./hr to $T_1$° C., holding at $T_1$ for 1–8 h, and then heating the glass coupons at a rate of 300° C./h to $T_2$° C., and thereafter holding at $T_2$ for 2–4 h, and then cooling the glass coupons at furnace rate; $T_1$ ranges from 650° to 750° C., while $T_2$ can range from 800° to 950° C.

The inventive compositions are self-nucleating due to liquid-liquid phase separation and therefore require no added nucleating agents. More specifically, nucleation is generally promoted by amorphous phase separation; it is surmised that the phases separated into were an alkali aluminosilicate-rich and higher gallia/alumina-rich regions. However, even though nucleating agents are not required, in some cases the addition of nucleating agents, such as $TiO_2$ (up to 5 wt. %), results in a finer crystal size and improved transparency.

The crystalline phases of the resulting glass-ceramic were identified using X-ray powder diffraction and spectroscopy techniques. An examination of Table I reveals that each of the inventive glass-ceramics exhibited a predominant aluminogallate spinel crystal phase. Specifically, the glass-ceramic microstructures consisted of aluminogallate spinel nanocrystals (($Li(Ga,Al)_5O_8$ and "$\gamma$-$(Ga,Al)_2O_3$"), typically ranging between 10–20 nm in size, dispersed throughout a stable, continuous aluminosilicate glass; the total crystallinity ranging between about 5%–25%.

FIG. 1 is an scanning transmission electron micrograph (STEM) taken at a magnification of 2000× (JEOL 2000FX) illustrating the crystalline microstructure of an ion milled thin section of Example 6; Bar=0.1 μm. The X-ray diffraction pattern for this material example indicated that the sample exhibited broad spinel peaks, while the spectroscopy data indicated that the spinel was a high gallate spinel, likely "$\gamma$-$(Ga,Al)_2O_3$").

Figure 2:
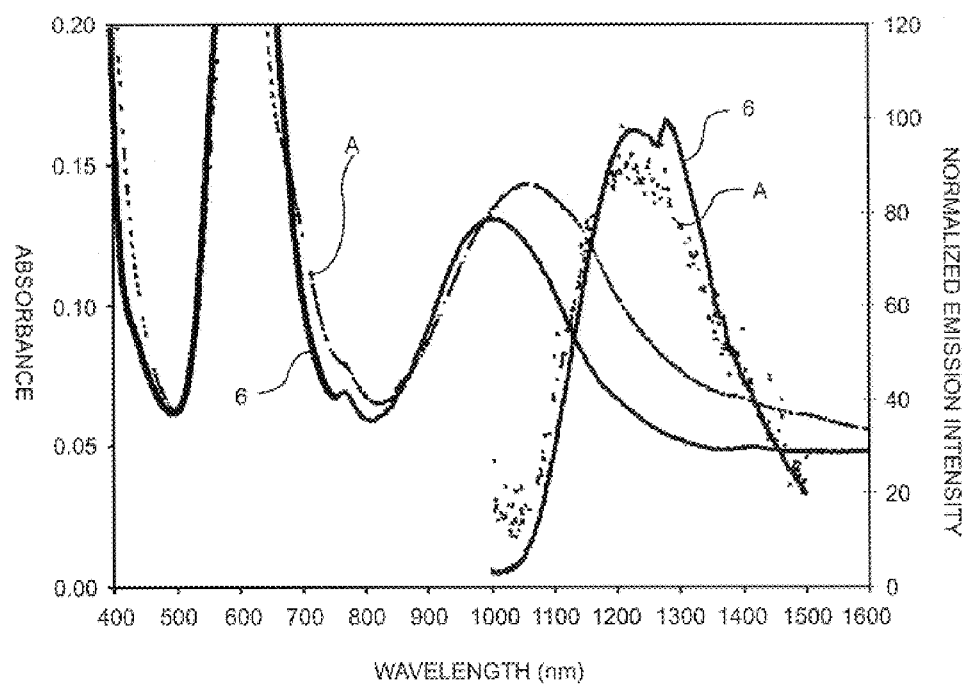
FIG. 2 is a graph illustrating the comparison of the fluorescence and absorption curves for inventive Example 6 and that of comparison example A.

In the manner similar to that described above for forming the aluminogallate samples, a gahnite glass-ceramic article, Comparison Example A, was formed of the following composition, in weight percent: 55.0% $SiO_2$, 20.2% $Al_2O_3$, 16.0% ZnO 2.3% $K_2O$, 6.5% $ZrO_2$ 0.5% NiO. FIG. 2 illustrates the absorption and emission spectra of a nickel-doped transparent aluminogallate spinel glass-ceramic (Examples 6 doped with 0.5 wt % NiO) as compared to the comparably doped aluminate spinel glass-ceramic of Comparison Example A. The comparison gahnite glass-ceramic has a higher crystallinity (approaching 30%), and, as such, the peak heights of the gallate and aluminate spinel absorbance curves can not be compared directly. It is clear, however, that the absorbance peak positions of the aluminogallate spinels are shifted significantly toward shorter wavelengths (higher energy) when compared with those of the aluminate spinel. The aluminogallate absorbance peaks are also narrower (FWHM) than those of the aluminate spinel glass-ceramic. The inventive aluminogallate spinel glass-ceramics also demonstrate strong, broadband fluorescence centered at 1250 nm.

Figure 3:
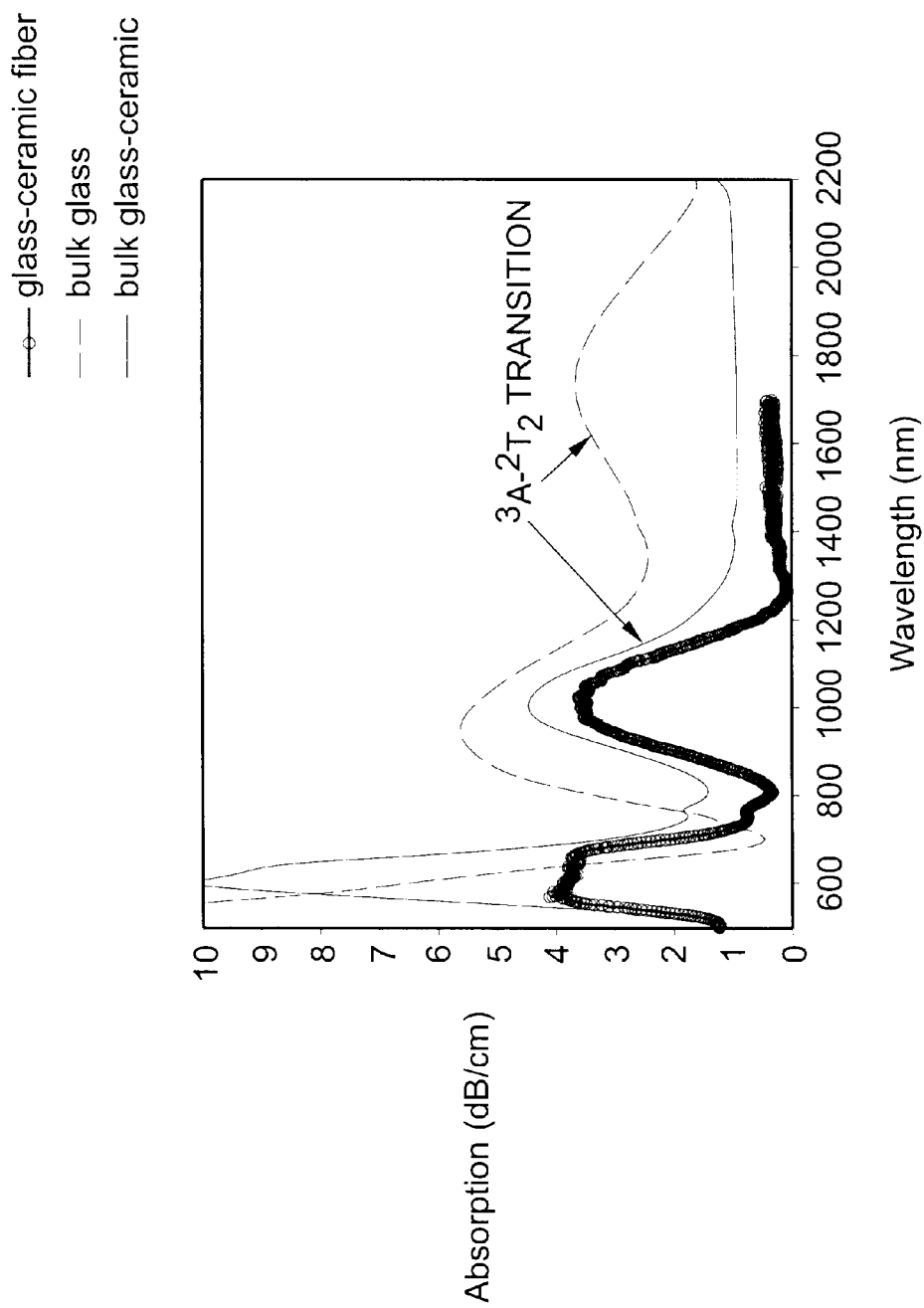
FIG. 3 is a graph illustrating the absorption curve for the glass, glass ceramic and glass-ceramic fiber forms of inventive Example 6.

In addition to glass-ceramic patties/coupons (i.e. bulk glass-ceramics), Ni-doped glass-ceramics (Example 6 composition above) were fabricated into clad fiber using a rod-in-tube technique as described in WO 01/31367 entitled "Method for Making Nanocrystalline Glass-ceramic Fibers", by G. H. Beall et al., co-assigned to the instant assignee. FIG. 3 compares the absorbance of the $Ni^{2+}$-doped glass-ceramic fiber with that of the aforementioned and described bulk glass-ceramic and its precursor glass (all doped with 0.5 wt % NiO). The spectroscopic features observed in the doped bulk sample are clearly reproduced in the fiber form, with the main absorption band at 1000 nm ($^3A_2$-$^3T_2$) corresponding to around 3.5 dB/cm. The peak position of the 1000 nm absorption band is identical for the cerammed fiber and the bulk glass-ceramic, while this transition occurs at much longer wavelength for the precursor glass (the $Ni^{2+}$ ion environment having low field strength in the glass and high field strength in the crystal.) Although this concentration of Ni ions is not high when compared with that used in bulk single crystals, the relatively low crystallinity (~15%) in the glass-ceramic, coupled with good partitioning of the $Ni^{2+}$ ions into the crystals, means that the ion concentration in these nanocrystals can be quite high. For this reason, the fluorescence properties of fibers containing only 0.05 wt % NiO were found to be greatly superior to those of higher-Ni compositions.

Table II discloses a number of glass compositions, expressed in terms of parts by weight on the oxide basis, illustrating varying CoO amounts. As before, the Table also presents the glass color, the heat-treatment schedule in ° C. and hours, the glass-ceramic color, as well as the degree of transparency of 0.5–1.0 cm examples, ranging from low to high, exhibited by each resulting glass-ceramic.

TABLE II

|  | 20 | 21 | 22 | 23 | 24 | 25 |
|---|---|---|---|---|---|---|
| $SiO_2$ | 38.6 | 38.6 | 38.6 | 38.6 | 38.6 | 38.6 |
| $Ga_2O_3$ | 25.1 | 25.1 | 25.1 | 25.1 | 25.1 | 25.1 |
| $Al_2O_3$ | 16.2 | 16.2 | 16.2 | 16.2 | 16.2 | 16.2 |
| $K_2O$ | 15.1 | 15.1 | 15.1 | 15.1 | 15.1 | 15.1 |
| $La_2O_3$ | 4.0 | 4.0 | 4.0 | 4.0 | 4.0 | 4.0 |
| MgO | 1.0 | 1.0 | 1.0 | 1.0 | 1.0 | 1.0 |
| $Co_2O_3$* | 0.005 | 0.01 | 0.03 | 0.08 | 0.12 | 0.20 |
| Glass Color |  | Blue | Blue | Blue |  | Blue |
| Heat Treatment (° C./hr.) | 900-2 | 900-2 | 900-2 | 900-2 | 900-2 | 900-2 |
| Glass-ceramic Color | Blue | Blue | Blue | Blue | Blue | Blue |
| Degree of Transparency | high | high | high | high | high | high |

*Transition metal oxide dopants in excess of 100%.

Figure 4:
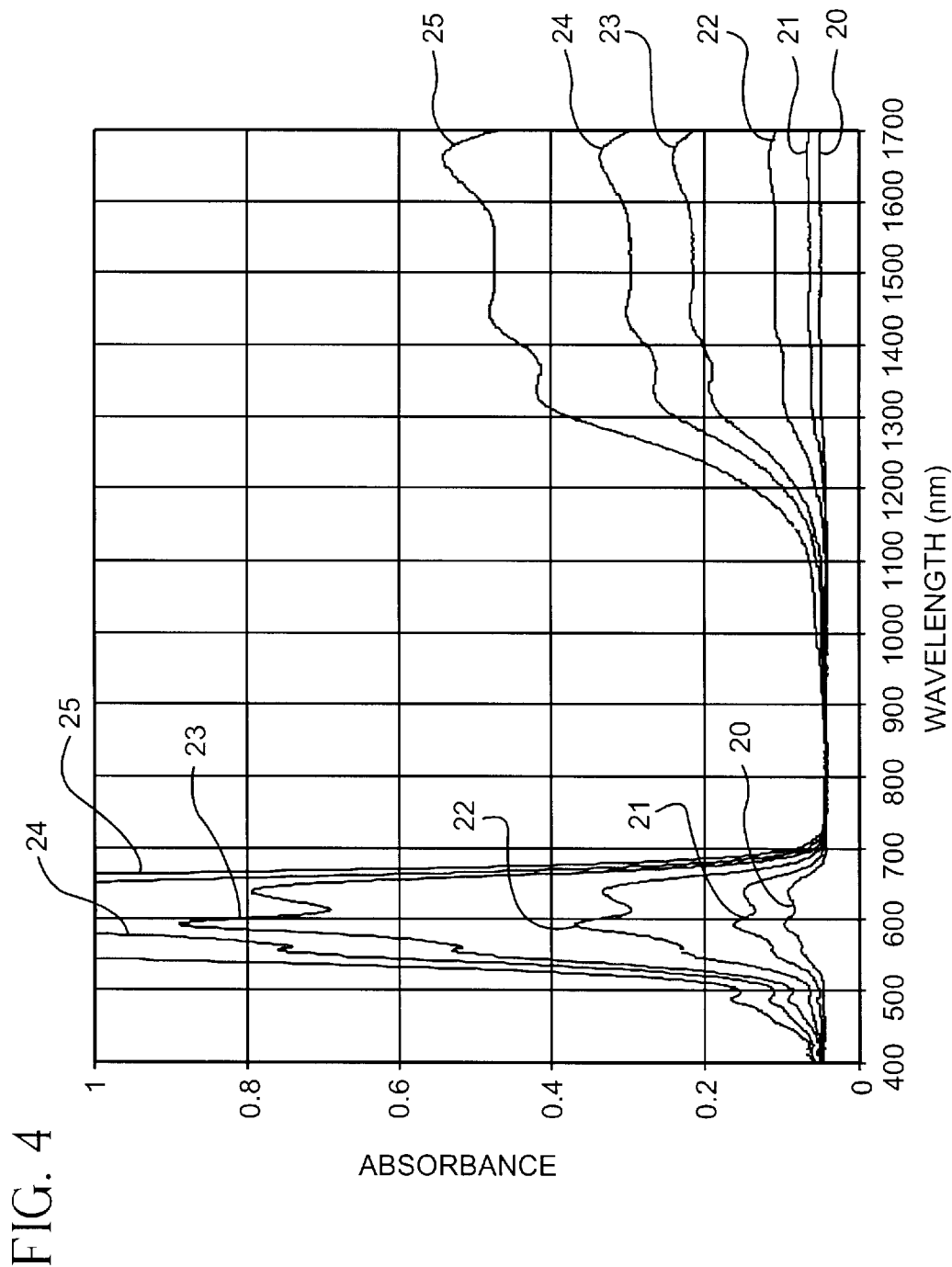
FIG. 4 is a graph illustrating the absorption curve for the inventive composition of Example 6 doped with varying amounts of CoboltOxide instead of nickle.

FIG. 4 reports the absorbance spectra of these aluminogallate glass-ceramics batched with increasing levels of Cobalt Oxide from 0.005% to 0.20%, as well as the corresponding spectrum for a doped, uncerammed glass of the same composition. The spectrum of the precursor uncerammed glass has a shape quite distinct from those of the glass-ceramics in both the visible and the infrared. The graph reveals that the doped glass-ceramics provide strong absorption across the entire telecommunications bandwidth with their absorbance curves being particularly flat between 1400 and 1600 nm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A substantially transparent glass-ceramic whose composition lies within the $SiO_2$—$Ga_2O_3$—$Al_2O_3$—$K_2O$—$Na_2O$ system and containing an aluminogallate spinel crystal phase, the composition consisting essentially, in weight percent on an oxide basis, of 25–55% $SiO_2$, 9–50% $Ga_2O_3$, 7–33% $Al_2O_3$, 0–20% $K_2O$, 0–15% $Na_2O$, 0–6 $Li_2O$, 5–30% $K_2O+Na_2O$, the glass ceramic microstructure containing a crystal phase comprising at least 5%, by weight, of aluminogallate spinel crystals.

2. The glass-ceramic of claim 1 further including the additional optional components comprising, in weight percent on the oxide basis, of, 0–5% MgO, 0–10% $TiO_2$ 0–15% $La_2O_3$, and 0–10% $ZrO_2$.

3. The glass-ceramic of claim 1 wherein said composition consists essentially, in weight percent on an oxide basis, of 27.5–50% $SiO_2$, 20–45% $Ga_2O_3$, 5–25% $Al_2O_3$, 0–20% $K_2O$, 0–15% $Na_2O$, 0–6 $Li_2O$, 10–20% $K_2O+Na_2O$.

4. The glass-ceramic of claim 1 wherein said composition consists essentially, in weight percent on an oxide basis, of 35–45% $SiO_2$, 20–30% $Ga_2O_3$, 15–25% $Al_2O_3$, 10–20% $K_2O$, 0–10% $Na_2O$, 0–6 $Li_2O$, 10–20% $K_2O+Na_2O$ and 0.001–0.5% $NiO+CoO+Cr_2O_3$.

5. The glass-ceramic of claim 1 wherein said composition further includes, in weight percent on an oxide basis, up to 1 wt. % nickel, chromium or cobalt oxide.

6. The glass-ceramic according to claim 1, wherein said composition includes, in weight percent on an oxide basis, about 0.001% to about 0.7% nickel, chromium or cobalt oxide.

7. The glass-ceramic of claim 1, wherein the composition includes, in weight percent on an oxide basis, about 0.01 to 0.5% nickel oxide.

8. The glass-ceramic of claim 1 wherein the crystals are nanocrystals and exhibit a size between about 10–20 nm.

9. The glass-ceramic of claim 1 wherein the crystal phase comprises between about 5–25%, by weight of aluminogallate spinel crystals.

10. The glass-ceramic of claim 1, wherein said composition further includes, in weight percent on an oxide basis, up to about 20% $GeO_2$.

11. The glass-ceramic according to claim 1, wherein said composition includes a transition metal ion selected from the group consisting of $Ni^{2+}$, $V^{3+}$, $Co^{2+}$, $Cu^{2+}$, $Cu^{1+}$, $Mn^{2+}$, $Cr^{3+}$, $Fe^{2+}$, $Fe^{3+}$, and $Ti^{3+}$.

12. An optical element selected from the group consisting of an optical fiber, a gain or laser medium, an amplifier component, saturable absorber media, the element comprising: a transparent glass-ceramic containing a crystallinity of at least about 5% by weight of aluminogallate spinel crystals, the glass-ceramic having a composition consisting essentially, in weight percent on an oxide basis, of 25–55% $SiO_2$, 9–50% $Ga_2O_3$, 2–35% $Al_2O_3$, 0–20% $K_2O$, 0–15% $Na_2O$, 0–6 $Li_2O$, 5–30% $K_2O+Na_2O$.

13. The optical element of claim 12 wherein the composition further includes the additional optional constituents comprising, in weight percent on the oxide basis, of 0–5% MgO, 0–10% $TiO_2$ 0–15% $La_2O_3$, and 0–10% $ZrO_2$.

14. The optical element of claim 12 wherein the composition consists essentially, in weight percent on an oxide basis, of 27.5–50% $SiO_2$, 20–45% $Ga_2O_3$, 5–25% $Al_2O_3$, 0–20% $K_2O$, 0–15% $Na_2O$, 0–6 $Li_2O$, 10–20% $K_2O+Na_2O$.

15. The optical element of claim 12 wherein said composition consists essentially, in weight percent on an oxide basis, of 35–45% $SiO_2$, 20–30% $Ga_2O_3$, 15–25% $Al_2O_3$, 10–20% $K_2O$, 0–10% $Na_2O$, 0–6 $Li_2O$, 10–20% $K_2O+Na_2O$ and 0.001–0.5% $NiO+CoO+Cr_2O_3$.

16. The optical element of claim 12 wherein the composition further includes, in weight percent on an oxide basis, up to 1 wt. % nickel, cobalt or chromium oxide.

17. The optical element of claim 12 wherein said composition includes, in weight percent on an oxide basis, about 0.001% to about 0.7% nickel, cobalt or chromium oxide.

18. The optical element of claim 12 wherein the composition includes, in weight percent on an oxide basis, about 0.01 to 0.5% nickel oxide.

19. The optical element of claim 12 wherein the crystals are nanocrystals and exhibit a size between about 10–20 nm.

20. The optical element of claim 12 wherein the crystal phase comprises between about 5–25%, by weight of aluminogallate spinel crystals.

21. The optical element of claim 12 wherein said composition further includes, in weight percent on an oxide basis, up to about 1.3% chromium oxide.

22. The optical element of claim 12 wherein said composition includes, in weight percent on an oxide basis, about 0.001% to about 0.7% chromium oxide.

23. The optical element of claim 12 wherein said composition further includes, in weight percent on an oxide basis, up to about 20% $GeO_2$.

24. The optical element of claim 12 wherein said composition includes a transition metal ion selected from the group consisting of $Ni^{2+}$, $V^{3+}$, $Co^{2+}$, $Cu^{2+}$, $Cu^{1+}$, $Mn^{2+}$, $Cr^{3+}$, $Fe^{2+}$, $Fe^{3+}$, and $Ti^{3+}$.

25. A method of making a substantially transparent glass-ceramic whose composition lies within the $SiO_2$—$Ga_2O_3$—$Al_2O_3$—$K_2O$—$Na_2O$ system and containing an aluminogallate spinel crystal phase, the method comprising the steps of:

e.) melting a batch for a glass having a composition consisting essentially, in weight percent on an oxide basis, of 25–55% $SiO_2$, 9–50% $Ga_2O_3$, 2–35% $Al_2O_3$, 0–20% $K_2O$, 0–15% $Na_2O$, 0–6 $Li_2O$, 5–30% $K_2O$+$Na_2O$;

f.) cooling the glass to a temperature at least below the transformation range of the glass;

g.) exposing the glass to a temperature between about 550–950° C. for a period of time sufficient to cause the generation of a glass-ceramic which is substantially transparent and which contains a predominant, aluminogallate spinel crystal phase crystal phase, the glass-ceramic composition within the $SiO_2$—$Ga_2O_3$—$Al_2O_3$—$K_2O$—$Na_2O$; and, h.) cooling the glass-ceramic to room temperature.

26. The method of claim 25 wherein the glass is exposed to a temperature of about 700–950° C. for about 1–4 hours.

27. The method of claim 25 wherein said glass is initially exposed to a temperature of about 650–750° C. for about 1–8 hours followed by exposure to a temperature of about 800–950 for about 2–4 hours.

28. The method of claim 25 wherein said composition consists essentially, in weight percent on an oxide basis, of 27.5–50% $SiO_2$, 20–45% $Ga_2O_3$, 5–25% $Al_2O3$, 0–20% $K_2O$, 0–15% $Na_2O$, 0–6 $Li_2O$, 10–20% $K_2O$+$Na_2O$.

29. The method of claim 25 wherein said composition consists essentially, in weight percent on an oxide basis, of 35–45% $SiO_2$, 20–30% $Ga_2O_3$, 15–25% $Al_2O_3$, 10–20% $K_2O$, 0–10% $Na_2O$, 0–6 $Li_2O$, 10–20% $K_2O$+$Na_2O$ and 0.001–0.5% $NiO$+$CoO$+$Cr_2O_3$.

30. The method of claim 25 wherein said composition is doped with, in weight percent on an oxide basis, up to 1 wt. % nickel, cobalt or chromium oxide.

31. The method of claim 25 wherein said composition is doped with, in weight percent on an oxide basis, about 0.001% to about 0.7% nickel, cobalt or chromium oxide.

32. The method of claim 25 wherein said composition is doped with, in weight percent on an oxide basis, about 0.01 to 0.5% nickel oxide.

* * * * *